(12) United States Patent
Fields, Jr. et al.

(10) Patent No.: US 7,689,771 B2
(45) Date of Patent: Mar. 30, 2010

(54) COHERENCY MANAGEMENT OF CASTOUTS

(75) Inventors: James S. Fields, Jr., Austin, TX (US);
Guy L. Guthrie, Austin, TX (US);
William J. Starke, Round Rock, TX (US); Derek E. Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 684 days.

(21) Appl. No.: 11/532,981

(22) Filed: Sep. 19, 2006

(65) Prior Publication Data

US 2008/0071994 A1    Mar. 20, 2008

(51) Int. Cl.
*G06F 12/00* (2006.01)

(52) U.S. Cl. .................. 711/122; 711/118; 711/119; 711/133; 711/135; 711/141; 711/146

(58) Field of Classification Search ................ 711/118, 711/119, 122, 133, 135, 141, 146
See application file for complete search history.

(56) References Cited

U.S. PATENT DOCUMENTS 5,802,571 A * 9/1998 Konigsburg et al. ......... 711/143
6,275,907 B1 * 8/2001 Baumgartner et al. ....... 711/143
6,275,909 B1 * 8/2001 Arimilli et al. .............. 711/146
6,279,086 B1 * 8/2001 Arimilli et al. .............. 711/143
6,334,172 B1 * 12/2001 Arimilli et al. .............. 711/144
6,360,301 B1 * 3/2002 Gaither et al. .............. 711/143
6,442,653 B1 * 8/2002 Arimilli et al. .............. 711/141
6,725,334 B2 * 4/2004 Barroso et al. .............. 711/122
6,990,559 B2 * 1/2006 Van Doren et al. .......... 711/141
6,993,631 B2 * 1/2006 Rowlands .................... 711/145
7,146,468 B2 * 12/2006 Hardage, Jr. ................ 711/141
7,237,070 B2 * 6/2007 Guthrie et al. .............. 711/144

* cited by examiner

*Primary Examiner*—Sanjiv Shah
*Assistant Examiner*—Arpan Savla
(74) *Attorney, Agent, or Firm*—Dillon & Yudell LLP

(57) ABSTRACT

According to one embodiment, a method of coherency management in a data processing system includes holding a cache line in an upper level cache memory in an exclusive ownership coherency state and thereafter removing the cache line from the upper level cache memory and transmitting a castout request for the cache line from the upper level cache memory to a lower level cache memory. The castout request includes an indication of a shared ownership coherency state. In response to the castout request, the cache line is placed in the lower level cache memory in a coherency state determined in accordance with the castout request.

10 Claims, 8 Drawing Sheets

COHERENCY MANAGEMENT OF CASTOUTS

BACKGROUND OF THE INVENTION

1. Technical Field

The present invention relates in general to data processing system and, in particular, to coherency management in a data processing system. Still more particularly, the present invention relates to a processor, data processing system and method supporting improved coherency management of castouts in a cache hierarchy of a data processing system.

2. Description of the Related Art

A conventional symmetric multiprocessor (SMP) computer system, such as a server computer system, includes multiple processing units all coupled to a system interconnect, which typically comprises one or more address, data and control buses. Coupled to the system interconnect is a system memory, which represents the lowest level of volatile memory in the multiprocessor computer system and which generally is accessible for read and write access by all processing units. In order to reduce access latency to instructions and data residing in the system memory, each processing unit is typically further supported by a respective multi-level cache hierarchy, the lower level(s) of which may be shared by one or more processor cores.

Cache memories are commonly utilized to temporarily buffer memory blocks that might be accessed by a processor in order to speed up processing by reducing access latency introduced by having to load needed data and instructions from system memory. In some multiprocessor (MP) systems, the cache hierarchy includes at least two levels. The level one (L1), or upper-level cache is usually a private cache associated with a particular processor core and cannot be directly accessed by other cores in an MP system. Typically, in response to a memory access instruction such as a load or store instruction, the processor core first accesses the upper-level cache. If the requested memory block is not found in the upper-level cache or the memory access request cannot be serviced in the upper-level cache (e.g., the L1 cache is a store-though cache), the processor core then access lower-level caches (e.g., level two (L2) or level three (L3) caches) to service the memory access to the requested memory block. The lowest level cache (e.g., L2 or L3) is often shared among multiple processor cores.

A coherent view of the contents of memory is maintained in the presence of potentially multiple copies of individual memory blocks distributed throughout the computer system through the implementation of a coherency protocol. The coherency protocol, for example, the well-known Modified, Exclusive, Shared, Invalid (MESI) protocol or a variant thereof, entails maintaining state information associated with each cached copy of the memory block and communicating at least some memory access requests between processing units to make the memory access requests visible to other processing units.

In order to synchronize access to a particular granule (e.g., cache line) of memory between multiple processing units and threads of execution, load-reserve and store-conditional instruction pairs are often employed. For example, load-reserve and store-conditional instructions have been implemented in the PowerPC® instruction set architecture with operation codes (opcodes) associated with the LWARX/LDARX and STWCX/STDCX mnemonics, respectively (referred to hereafter as LARX and STCX). Execution of a LARX instruction by a processor loads a specified cache line into the cache memory of the processor and sets a reservation flag and address register signifying the processor has interest in atomically updating the cache line through execution of a subsequent STCX instruction targeting the reserved cache line. The cache then monitors the storage subsystem for operations signifying that another processor has modified the cache line, and if one is detected, resets the reservation flag to signify the cancellation of the reservation. When the processor executes a subsequent STCX targeting the cache line reserved through execution of the LARX instruction, the cache memory only performs the cache line update requested by the STCX if the reservation for the cache line is still pending. Thus, updates to shared memory can be synchronized without the use of an atomic update primitive that strictly enforces atomicity.

The state of the reservation flag and the caching of the reserved cache line are independent, meaning that the reservation flag is not reset automatically if the associated cache line is removed from the cache of the reserving processor, for example, by a castout operation. If a reserved cache line that is castout from a cache memory is subsequently modified by a processor other than the reserving processor, the reservation will be automatically canceled through conventional coherency communication if the reserved cache line is in a state other than Modified. However, because a Modified cache line can be updated "silently" (i.e., without inter-cache coherency communication), special provision must be made for such cache lines in order to ensure that a STCX that should fail does not succeed.

In one prior art implementation, one coherency protocol addressed the above operating scenario by permitting a cache line (including a reserved cache line) to be castout from an upper level cache to a lower level cache in the same coherency state as the cache line was held in the upper level cache and by requiring the coherency state of the cache line to be downgraded, if applicable, from an exclusive ownership state (e.g., Modified (M)) to a shared ownership state (e.g., Tagged (T)) if the cache line were again obtained by an upper level cache from the lower level cache. The enforced downgrade ensures that any pending reservation for the cache line is canceled in the event that a different processor attempts to update the cache line while holding the cache line in the exclusive ownership state.

SUMMARY OF THE INVENTION

The present invention recognizes that, when possible, it would be desirable to preserve exclusive ownership coherency states, such as the Modified (M) coherency state, in order to reduce latency and eliminate unnecessary coherency communication in the event a cache line is updated. Accordingly, the present invention provides improved processors, data processing systems and methods of data processing supporting improved coherency management of castouts in a cache hierarchy of a data processing system.

According to one embodiment, a method of coherency management in a data processing system includes holding a cache line in an upper level cache memory in an exclusive ownership coherency state and thereafter removing the cache line from the upper level cache memory and transmitting a castout request for the cache line from the upper level cache memory to a lower level cache memory. The castout request includes an indication of a shared ownership coherency state. In response to the castout request, the cache line is placed in the lower level cache memory in a coherency state determined in accordance with the castout request.

All objects, features, and advantages of the present invention will become apparent in the following detailed written description.

BRIEF DESCRIPTION OF THE DRAWINGS

The novel features believed characteristic of the invention are set forth in the appended claims. However, the invention, as well as a preferred mode of use, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
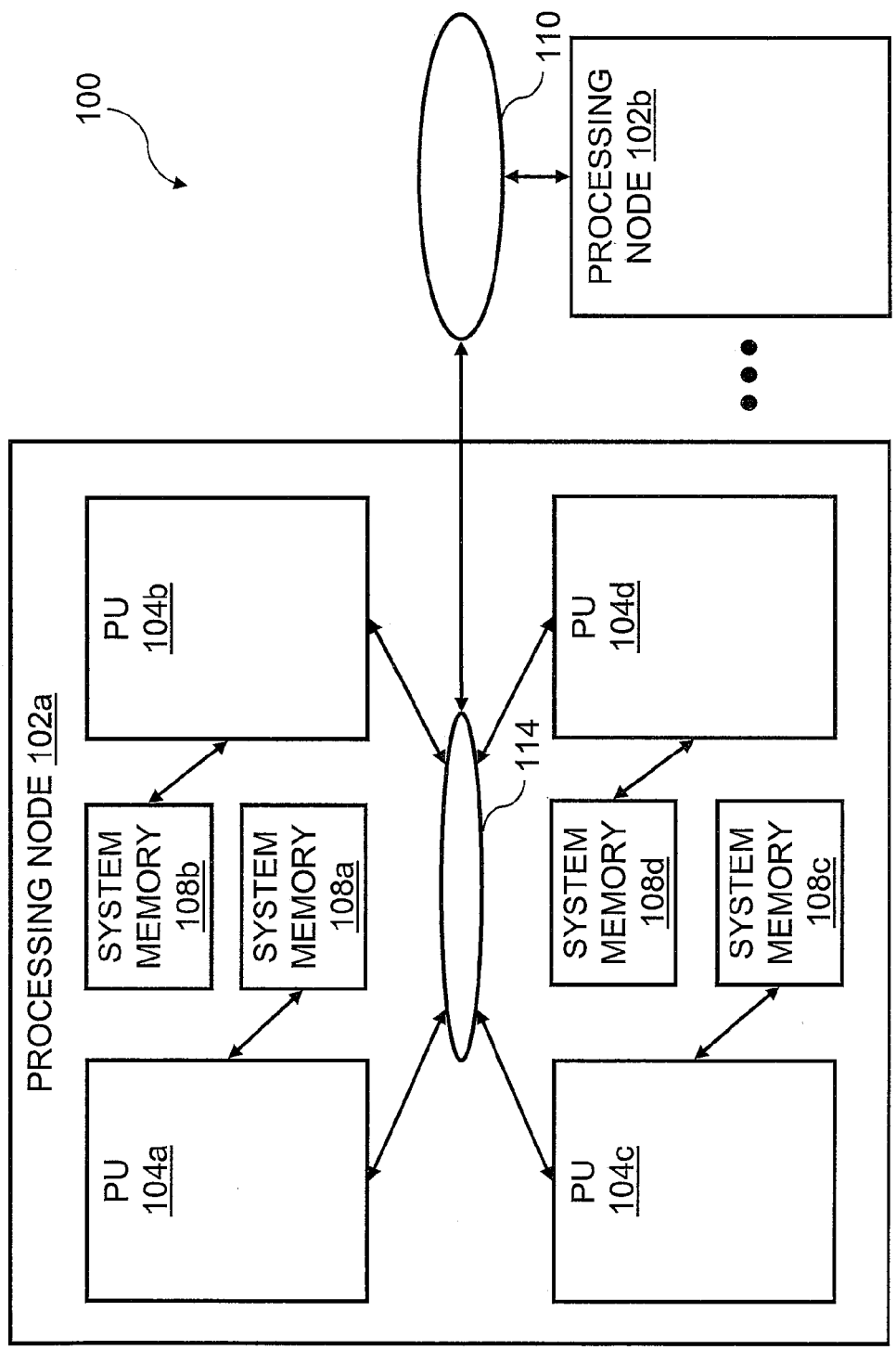
FIG. 1 is a high level block diagram of an illustrative data processing system in accordance with the present invention.

With reference now to the figures, wherein like reference numerals refer to like and corresponding parts throughout, and in particular with reference to FIG. 1, there is illustrated a high-level block diagram depicting an exemplary data processing system in which the present invention may be implemented. The data processing system is depicted as a cache coherent symmetric multiprocessor (SMP) data processing system 100. As shown, data processing system 100 includes multiple processing nodes 102a, 102b for processing data and instructions. Processing nodes 102 are coupled to a system interconnect 110 for conveying address, data and control information. System interconnect 110 maybe implemented, for example, as abused interconnect, a switched interconnect or a hybrid interconnect.

In the depicted embodiment, each processing node 102 is realized as a multi-chip module (MCM) containing four processing units 104a-104d, each preferably realized as a respective integrated circuit. The processing units 104 within each processing node 102 are coupled for communication to each other and system interconnect 110 by a local interconnect 114, which, like system interconnect 110, maybe implemented, for example, with one or more buses and/or switches.

Figure 2:
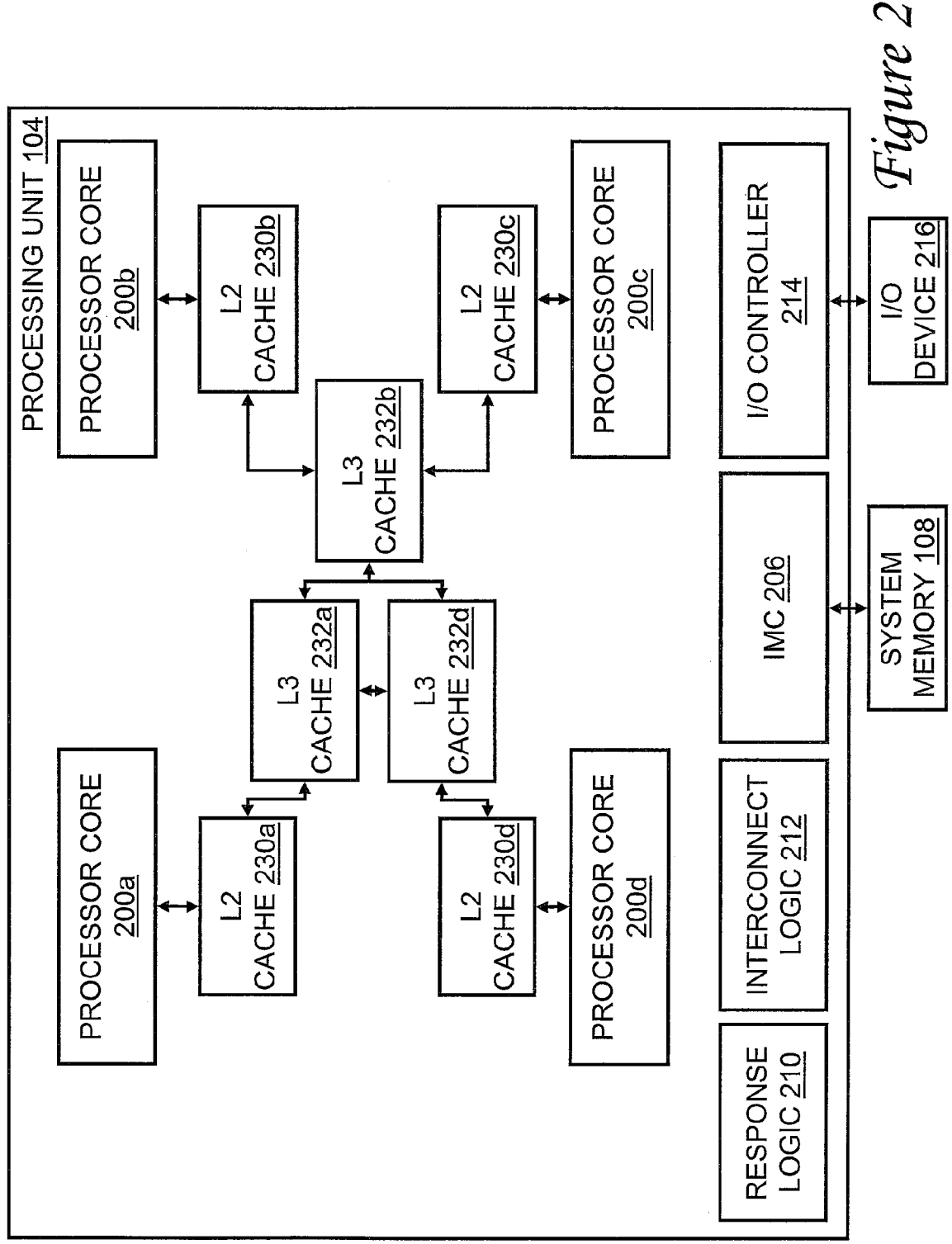
FIG. 2 is a more detailed block diagram of an illustrative embodiment of a processing unit in the data processing system of FIG. 1.

As depicted in FIG. 2, processing units 104 each include an integrated memory controller (IMC) 206 coupled to a respective system memory 108. Data and instructions residing in system memories 108 can generally be accessed and modified by a processor core in any processing unit 104 of any processing node 102 within data processing system 100. In alternative embodiments of the invention, one or more memory controllers 206 (and system memories 108) can be coupled to system interconnect 110 or a local interconnect 114.

Those skilled in the art will appreciate that SMP data processing system 100 of FIG. 1 can include many additional non-illustrated components, such as interconnect bridges, non-volatile storage, ports for connection to networks or attached devices, etc. Because such additional components are not necessary for an understanding of the present invention, they are not illustrated in FIG. 1 or discussed further herein. It should also be understood, however, that the enhancements provided by the present invention are applicable to cache coherent data processing systems of diverse architectures and are in no way limited to the generalized data processing system architecture illustrated in FIG. 1.

Referring now to FIG. 2, there is depicted a more detailed block diagram of an exemplary processing unit 104 in accordance with the present invention. In the depicted embodiment, each processing unit 104 includes four processor cores 200a-200d for independently processing instructions and data. In one preferred embodiment, each processor core 200 supports multiple (e.g., two) concurrent hardware threads of execution.

The operation of each processor core 200 is supported by a multi-level volatile memory subsystem having at its lowest level shared system memory 108, and at its upper levels, two or more levels of cache memory for caching data and instructions residing within cacheable addresses. In the illustrative embodiment, the cache memory hierarchy includes a respective store-through level one (L1) cache within and private to each processor core 200, a respective store-in level two (L2) cache 230 private to each processor core 200, and L3 victim caches 232 for buffering L2 castouts. In the depicted embodiment, processor cores 200a and 200d each has a respective L3 cache (i.e., L3 caches 230a and 230d, respectively), and processor cores 200b and 200c share L3 cache 230b. Of course, in other embodiments, each of processor cores 200 may have its own respective L3 cache 232 or each of processor cores 200 may share an L3 cache with one or more other processor cores 200. In at least some embodiments, L3 caches 232 are further coupled together to permit data exchange, including permitting an L3 cache 232 to castout one of its cache lines into another of L3 caches 232 to preserve data likely to be accessed by a processor core 200 within the cache hierarchy of processing unit 104 for as long as possible.

Each processing unit 104 further includes an instance of response logic 210, which implements a portion of the distributed coherency signaling mechanism that maintains cache coherency within data processing system 100. In addition, each processing unit 104 includes an instance of interconnect logic 212 for managing communication between processing unit 104 and local interconnect 114 and system interconnect 110. L2 caches 230 and L3 caches 232 are each coupled to interconnect logic 212 to enable participation in data and coherency communication on interconnects 110 and 114 of FIG. 1. Finally, each processing unit 104 includes an integrated I/O (input/output) controller 214 supporting the attachment of one or more I/O devices, such as I/O device 216. I/O controller 214 may issue operations on local interconnect 114 and/or system interconnect 110 in response to requests by I/O device 216.

Figure 3:
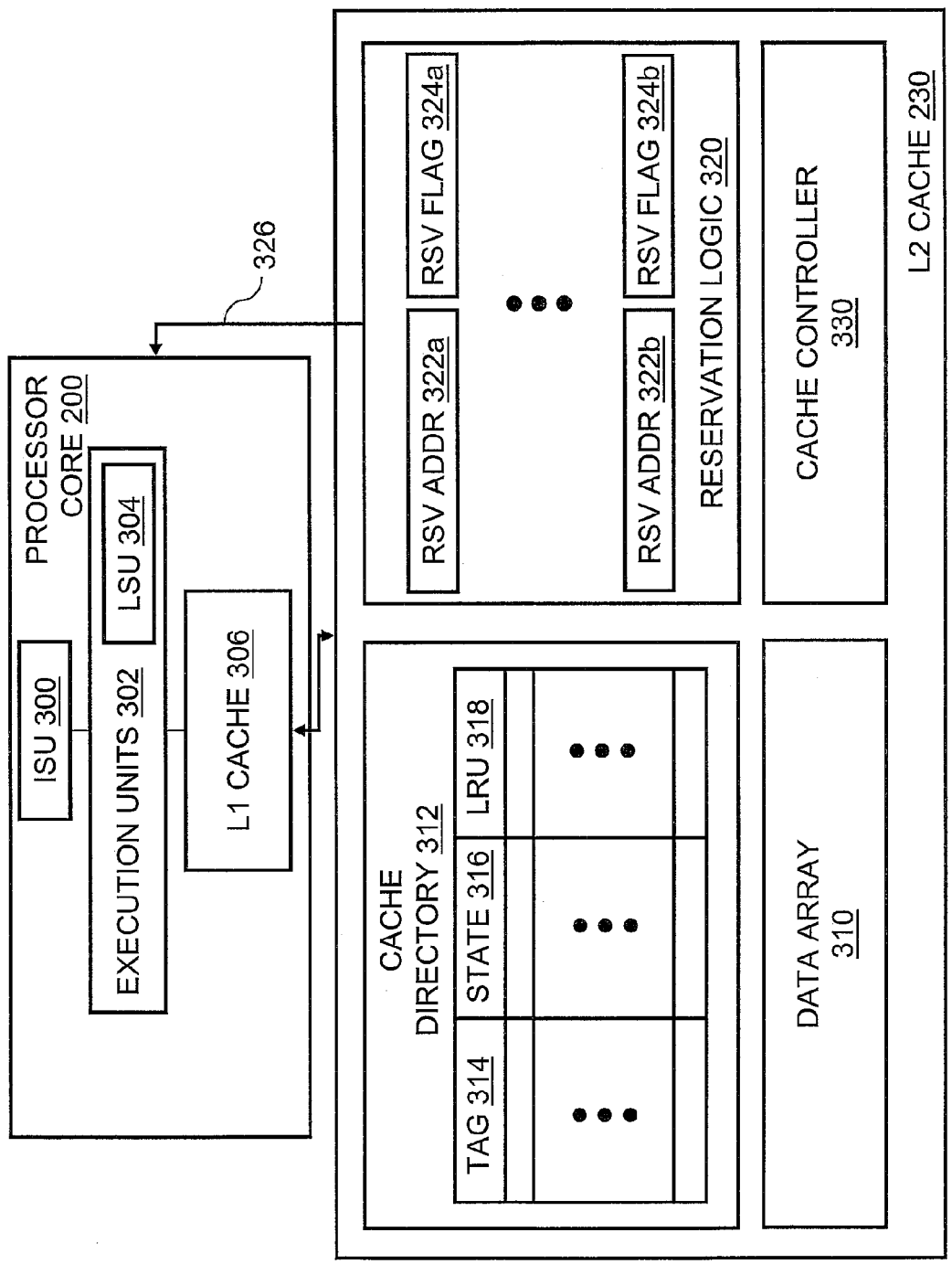
FIG. 3 is a more detailed block diagram of a processor core and L2 cache in the processing unit of FIG. 2.

With reference now to FIG. 3, there is illustrated a more detailed block diagram of a processor core 200 and L2 cache 230 within processing unit 104 of FIG. 2. As depicted, processor core 200 includes an instruction sequencing unit (ISU) 300 for fetching and ordering instructions for execution, one or more execution units 302 for executing instructions, and an L1 cache 306.

Execution units 302 include a Load-Store Unit (LSU) 304 that executes memory access instructions to cause data to be loaded from and stored to memory. Such memory access instructions include load-reserve and store-conditional instructions, which are utilized to synchronize access to shared memory between a particular thread of execution and other concurrent threads of execution, whether executing in the same processor core 200, a different processor core 200 in the same processing unit 104, or in a different processing unit 104.

In accordance with the present invention, L1 cache 306, which may include bifurcated L1 data and instruction caches, is implemented as a store-through cache, meaning that the point of cache coherency with respect to other processor cores 200 is located below L1 cache 306 and, in the depicted embodiment, is located at L2 cache 230. Accordingly, L1 cache 306 does not maintain true cache coherency states for its cache lines, but only maintains valid/invalid bits.

As further illustrated in FIG. 3, L2 cache 230 contains a data array 310 that stores cache lines of instructions and data, a cache directory 312 of the contents of data array 300, and a cache controller 330 that controls the data and coherency operations of L2 cache 230. As in conventional set associative caches, memory locations in system memories 108 are mapped to particular congruence classes within data array 310 utilizing predetermined index bits within the system memory (real) addresses. The standard memory block for the coherency system is set at a 128 byte cache line in one embodiment. The particular cache lines stored within data array 310 are recorded in cache directory 312, which contains one directory entry for each cache line in data array 310. As understood by those skilled in the art, each directory entry in cache directory 302 comprises at least a tag field 314, which specifies the particular cache line stored in data array 310 utilizing a portion of the corresponding real address, a state field 316, which indicates the coherency state of the cache line, and a LRU (Least Recently Used) field 318 indicating a replacement order for the cache line with respect to other cache lines in the same congruence class.

The coherency states that may be recorded within state field 316 are implementation-specific and may vary depending upon the system architecture and desired level of complexity and precision. In one preferred embodiment (others are possible), a variant of the well-known MESI (Modified, Exclusive, Shared, Invalid) protocol is employed, which includes at least the coherency states listed in Table I below:

TABLE I

| | NAME | DEFINITION |
|---|---|---|
| I | Invalid state | The cache line data and tag are both invalid |
| S | Shared state | A shared state in which the cache line data and tag are both valid. The cache line may also be valid in other L2/L3 caches. |
| T | Tagged state | A shared ownership state in which the cache line data and tag are both valid. The data is modified with respect to system memory, but was sourced by this cache to another cache and may accordingly be shared by multiple caches at the same or different levels of the cache hierarchy. A cache line in this state cannot |

TABLE I-continued

| | NAME | DEFINITION |
|---|---|---|
| | | be modified without issuing an operation to make the modification visible to other caches. A cache line in this state can be sourced to a requesting cache by cache-to-cache data intervention. Because T is an ownership state, the owning cache is responsible for ensuring the modified data is written back to system memory. |
| M | Modified state | An exclusive ownership state in which the cache line data and tag are both valid. The data has been modified with respect to system memory and is exclusive to this cache. The cache line cannot be valid in any other cache. In this state, the cache line can be modified "silently" without notifying other caches of a processor core's intent to update the cache line. A cache line is this state can be sourced to a requesting cache by cache-to-cache data intervention. |
| Me | Modified-Exclusive state | An exclusive ownership state in which the cache line data and tag are both valid. The data has not been modified with respect to system memory and is exclusive to this cache. The cache line cannot be valid in any other cache. In this state, the cache line can be modified "silently" without notifying other caches of a processor core's intent to update the cache line. A cache line is this state can be sourced to a requesting cache by cache-to-cache data intervention. |

Those skilled in the art will appreciate that the exemplary coherency states set forth in Table I can be expanded to include one or more additional coherency states, including additional invalid states, shared states, shared ownership states, and exclusive ownership states.

L2 cache 330 finally includes reservation logic 320 for recording reservations of the threads executed by the associated processor core 200. Specifically, reservation logic 320 includes, for each thread that maybe concurrently executed by its processor core 200, a respective reservation register comprising a reservation address field 322 and a reservation flag 324. For example, in the depicted example, which assumes that processor core 200 can execute two threads concurrently, reservation logic 320 includes two reservation registers for processor core 200: reservation address field 322a and reservation flag 324a for thread0 and reservation address field 322b and reservation flag 324b for thread1. When set (e.g., to '1'), a reservation flag 324 indicates that the associated thread of execution holds a reservation for the address contained in the associated reservation address field 322 and otherwise indicates no reservation is held. Reservation logic 320 supplies pass/fail indications indicating the outcomes of store-conditional operations to processor core 200 via respective pass/fail buses 326.

Figure 4:
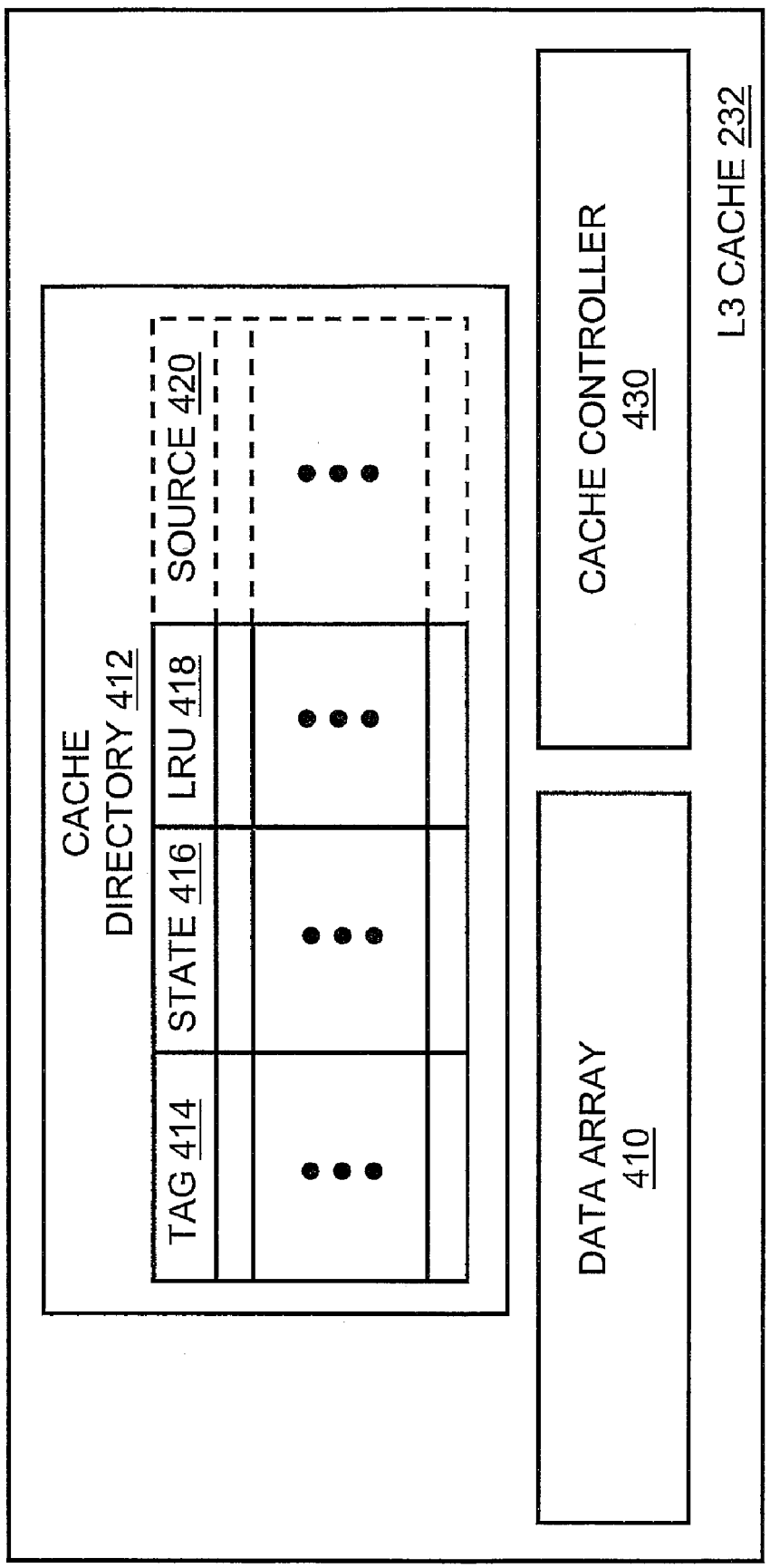
FIG. 4 is a more detailed block diagram of an L3 cache in the processing unit of FIG. 2.

Referring now to FIG. 4, there is depicted a more detailed block diagram of an exemplary embodiment of an L3 cache in accordance with the present invention. As can be seen by comparison of FIGS. 3 and 4, L3 cache 232, which serves as a victim cache for buffering L2 castouts, is configured similarly to L2 cache 230 of FIG. 3. Accordingly, L3 cache 232 includes a set-associative data array 410, a cache directory 412 of the contents of data array 410, and a cache controller 430. As further shown in FIG. 4, each directory entry in cache directory 412 comprises at least a tag field 414, which specifies the particular cache line stored in data array 410 utilizing a portion of the corresponding real address, a state field 416, which indicates the coherency state of the cache line, and a LRU (Least Recently Used) field 418 indicating a replacement order for the cache line with respect to other cache lines in the same congruence class. In at least some embodiments of the present invention in which L3 cache 232 is shared by multiple L2 caches 230 and/or L3 caches 232 are coupled to permit L3-to-L3 castouts, each entry in L3 cache directory 412 further includes a source field 420 indicating which L2 cache 230 was the original source of the cache line.

Figure 5:
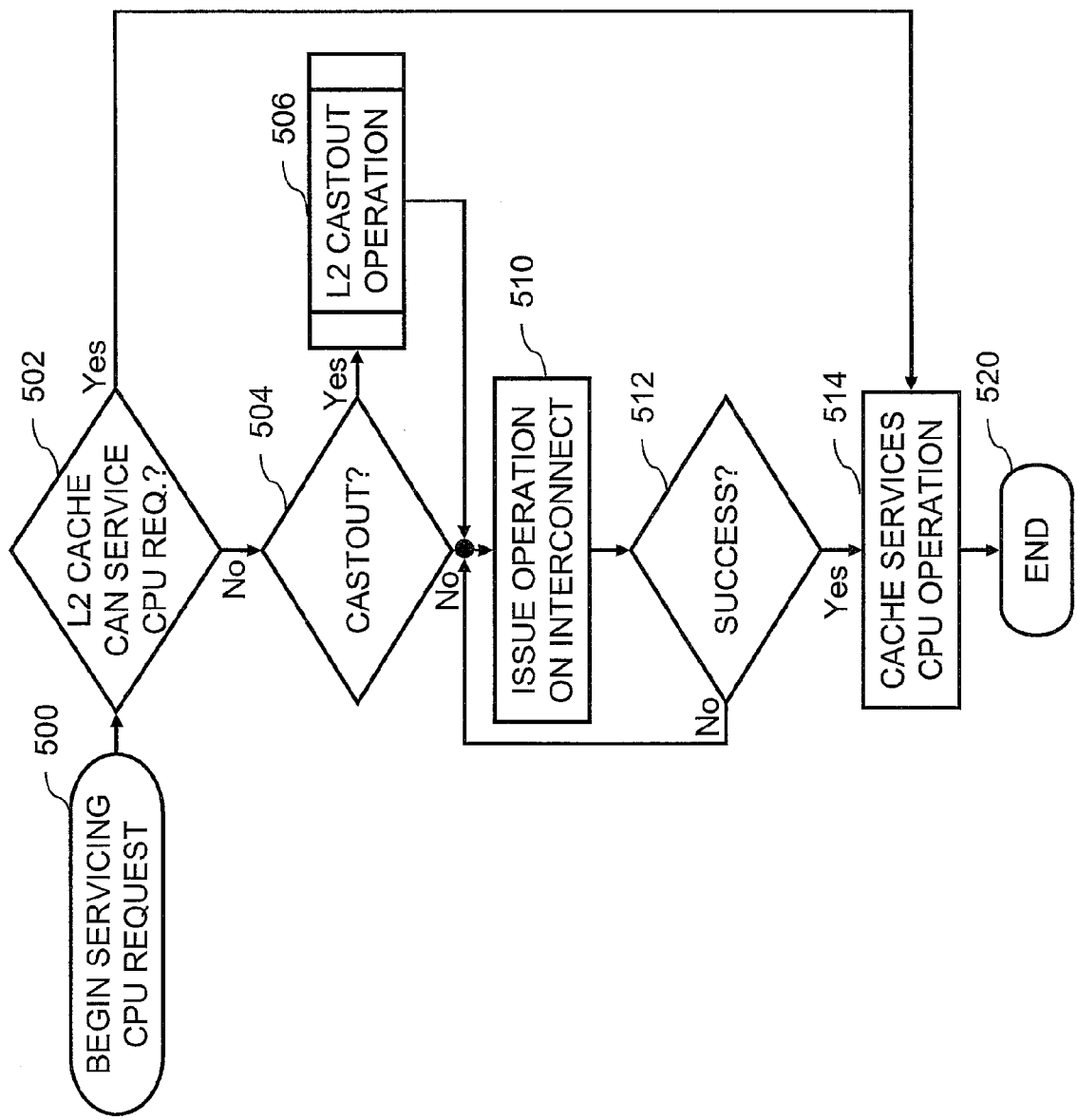
FIG. 5 is a high level logical flowchart of an exemplary method by which an L2 cache memory services an operation received from a processor core in the data processing system of FIG. 1.

With reference first to FIG. 5, there is depicted a high level logical flowchart of an exemplary method by which an L2 cache services a processor (CPU) request in a data processing system in accordance with the present invention. As shown, the process begins at block 500, which represents a cache controller 330 in an L2 cache 230 receiving a CPU request (e.g., a CPU data load request, a CPU data store request, a CPU load-and-reserve request, a CPU instruction load request, etc.) from an associated processor core 200 in its processing unit 104. In response to receipt of the CPU request, cache controller 330 determines at block 502 whether or not the target memory block, which is identified within the CPU request by a target real address, is held in L2 cache directory 312 in a coherency state that permits the CPU request to be serviced without issuing an operation on the interconnect fabric. For example, a CPU instruction fetch request or data load request can be serviced without issuing a bus operation on the interconnect fabric if L2 cache directory 312 indicates that the coherency state of the target memory block is any of the M, Me, T, or S states. A CPU data store request can be serviced without issuing a bus operation on the interconnect fabric if L2 cache directory 312 indicates that the coherency state of the target memory block is one of the M or Me states. If cache controller 330 determines at block 502 that the CPU request can be serviced without issuing a bus operation on the interconnect fabric, cache controller 330 accesses L2 data array 310 to service the CPU request, as shown at block 514. For example, cache controller 330 may obtain a requested memory block and supply the requested memory block to the requesting processor core 200 in response to a CPU data load request or instruction fetch request or may store data provided in a CPU data store request into L2 data array 310. Following block 514, the process terminates at block 520.

Returning to block 502, if the target memory block is not held in L2 directory 312 in a coherency state that permits the CPU request to be serviced without issuing a bus operation on the interconnect fabric, a determination is also made at block 504 whether or not a castout of an existing L2 cache line is required or desirable to accommodate the target memory block in L2 cache 230. In one embodiment, a castout operation is implemented at block 504 if a memory block is selected for eviction from the L2 cache 230 of the requesting processor in response to the CPU request and is marked in L2 cache directory 312 as being in any of the M, Me, T or S coherency states. In response to a determination at block 504 that a castout is implemented, cache controller 330 performs an L2-to-L3 cache castout operation, as indicated at block 506. The castout operation depicted at block 506 may further cause the recipient L3 cache 232 to performs its own castout, as discussed further below. Cache controller 330 also initiates a bus operation on the interconnect fabric comprising interconnects 110 and 114, as illustrated at block 510.

In response to the bus operation, cache controller 330 receives a coherency message, called a combined response, which provides the system's response to the bus operation. Cache controller 330 tests the combined response at block 512. If the combined response does not indicate that the bus operation was successful (e.g., the combined response indicates "Retry"), cache controller 330 reissues the bus operation, as indicated by the process returning to block 510. If, on the other hand, cache controller 330 receives a combined response for the bus operation indicating "Success" at block 512, the process passes to block 514, which represents controller 232 servicing the CPU request. Thereafter, the process ends at block 520.

According to the present invention, the management of coherency states for castout cache lines by cache controllers 330, 430 (e.g., during L2 castout operation 506 of FIG. 5 and any subsequent transfer of the cache line) takes into account the possibility that a processor core 200 has a pending reservation for a castout cache line in an exclusive ownership (e.g., M or Me) state. The reservation-aware coherency management of cache controllers 330, 430 can be realized in a variety of different embodiments, based upon a number of design factors, including (1) whether a cache line in an exclusive ownership state that is castout from a source higher level cache is downgraded to a shared state (e.g., T) in a recipient lower level cache, (2) what coherency state a cache line that has been castout can be passed "horizontally" between two lower level caches (e.g., L3 s), and (3) what coherency state a cache line that has been castout can be passed "vertically" from a lower level cache (L3) to a higher level cache (L2). Five such embodiments will be described herein.

In first and second embodiments of the coherency management of the present invention, the coherency state of a cache line that is held an upper level (e.g., L2) cache in an exclusive ownership (e.g., M or Me) state and then castout to a lower level (e.g., L3) cache is modified to account for a possible reservation of the cache line only during the initial castout operation. No additional coherency state management is required to account for a possible reservation if the cache line is subsequently passed to another cache horizontally (e.g., L3-to-L3) or vertically (L3-to-L2). The first and second embodiments differ in that, in the first embodiment, a cache line in an exclusive ownership state that is castout from an upper level (e.g., L2) to a lower level (e.g., L3) cache is imprecisely downgraded from an exclusive ownership state to a shared ownership state in the lower level cache, presuming that a reservation for the cache line may exist. The second embodiment, on the other hand, precisely downgrades the coherency state of the line from an exclusive ownership state to a shared ownership state only if a reservation for the cache line does, in fact, exist. In the first and second embodiments, no source field 420 is employed.

In third, fourth and fifth embodiments of the coherency management of the present invention, the coherency state of a cache line that is held an upper level (e.g., L2) cache in an exclusive ownership (e.g., M or Me) state and then castout to a lower level (e.g., L3) cache is modified to account for a possible reservation of the cache line only upon cache-to-cache transfers of the cache line following the initial castout operation. That is, in the third, fourth and fifth embodiments of the present invention, a cache line in an exclusive ownership (e.g., M or Me) state is castout in that same exclusive ownership state. The third, fourth and fifth embodiments then differ in how the coherency states of such castout cache lines are downgraded, if necessary.

In the third embodiment, the lower level cache is private (i.e., directly connected to only a single upper level cache), and no source tracking utilizing source field 420 is employed. In this third embodiment, the coherency state of a cache line castout in an exclusive ownership state is unchanged if the cache line is subsequently transferred back to the upper level cache (e.g., in response to a data request) and, if a horizontal (e.g., L3-to-L3) transfer of the castout cache line is permitted, is downgraded from an exclusive ownership (e.g., M or Me) coherency state to a shared ownership (e.g., T) coherency state upon the horizontal (e.g., L3-to-L3) transfer.

In the fourth and fifth embodiments, source tracking of the coherency state of the cache line utilizing source field 420 is employed. In the fourth embodiment, source tracking is limited to upper level cache memories directly connected to the lower level cache memory, for example, as L2 caches 230b and 230c are directly connected to L3 cache 232b. In this fourth embodiment, a castout cache line is downgraded from an exclusive ownership (e.g., M or Me) coherency state to a shared ownership (e.g., T) coherency state upon a horizontal (e.g., L3-to-L3) transfer of the castout cache line or a vertical (e.g., L3-to-L2) transfer to an upper level cache other than the source cache, but retains the exclusive ownership state upon a vertical transfer to the upper level source cache.

In the fifth embodiment, source tracking at a lower level cache memory is extended to all upper level cache memories within the same processing unit (e.g., all of L2 caches 230a-230d). In the fifth embodiment, a castout cache line is permitted to retain an exclusive ownership state upon any horizontal (e.g., L3-to-L3) transfer of the castout cache line or a vertical (e.g., L3-to-L2) transfer to the upper level source cache, but is downgraded from an exclusive ownership state to a shared ownership state (e.g., T) upon a vertical (e.g., L3-to-L2) transfer to an upper level cache other than the source cache. To permit the horizontal transfer of a castout cache line in an exclusive ownership state between lower level caches, the transfer between lower level caches includes the source tracking information from source field 420.

It will be appreciated that the foregoing embodiments of the present invention are not exclusive. In fact, any of the first through fourth embodiments may be employed in a data processing system in conjunction with any number of the first through fourth embodiments of the present invention. In addition, the fifth embodiment of the present invention may be employed together with one or more other embodiments of the present invention in the same data processing system, as long as all cache memories in any processing unit that implements the fifth embodiment are configured to implement the fifth embodiment of the present invention.

Figure 6:
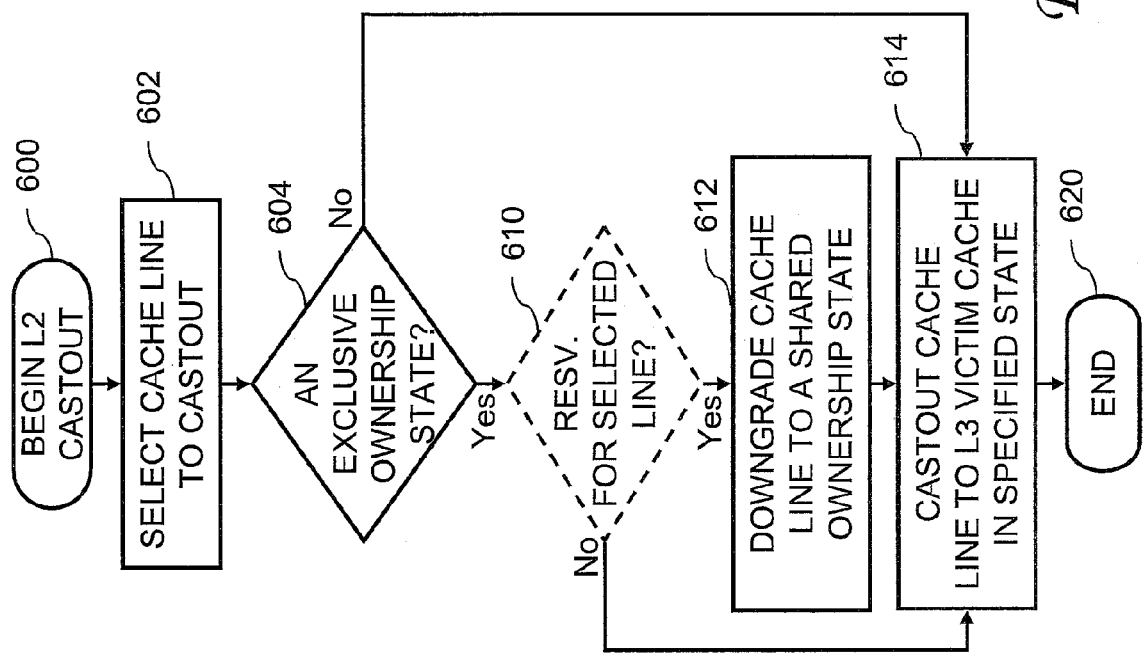
FIG. 6 is a high level logical flowchart of an exemplary method by which an L2 cache memory performs a castout operation according to first and second embodiments of the present invention.

Referring now to FIG. 6, there is depicted a high level logical flowchart of an exemplary L2 castout process in accordance with the first and second embodiments of the present invention. As illustrated, the process begins at block 600, for example, in response to a determination by an L2 cache controller 330 at block 504 of FIG. 5 that an L2 castout operation should be performed to service a CPU request. The process then proceeds to block 602, which depicts cache controller 330 selecting a cache line to castout, for example, by reference to the LRU field 318 of directories entries in the congruence class to which the target address of the CPU request maps. Cache controller 330 then determines at block 604 whether or not state field 316 indicated an exclusive ownership state (e.g., M or Me) for the cache line immediately prior to initiation of the castout operation. If not, the process passes to block 614, which depicts cache controller 330 transmitting a castout request containing the cache line of data, its real address, and the coherency state recorded within cache directory 312 to the affiliated L3 cache 232. The cache controller 430 of the affiliated L3 cache 232 places the cache line in data array 410 and updates the tag field 414, state field 416 and LRU field 418 of the corresponding entry in its cache directory 412 based upon the contents of the castout request. In this case, no coherency state change is made to the cache line by the castout operation. Following block 614, the process terminates at block 620.

Returning to block 604, in response to determining that the cache line to be castout is in an exclusive ownership state, L2 cache controller 330 then downgrades the state of the cache line, if necessary, as shown at blocks 610-612. In the first embodiment of the present invention in which the coherency state downgrade is made imprecisely, cache controller 330 omits the determination depicted at optional block 610 and downgrades the coherency state of the cache line to be castout from an exclusive ownership state (e.g., M or Me) to a shared ownership state (e.g., T). Cache controller 330 then issues a castout request to the affiliated L3 cache 232, specifying the shared ownership (e.g., T) state (block 614), thereby ensuring that any subsequent updates to the cache line are made visible to all caches that need to be aware of the update. As noted above, the castout operation depicted at block 614 may farther cause the recipient L3 cache 232 to performs its own castout, as discussed further below. Thereafter, the process terminates at block 620.

Alternatively, in the second embodiment of the present invention, cache controller 330 performs the check of reservation logic 320 depicted at block 610 to determine whether or not reservation address fields 322 and reservation flags 324 indicate that a reservation is currently pending for the cache line. If cache controller 330 determines that a reservation for the address of the cache line is not currently pending, cache controller 330 does not downgrade the coherency state of the cache line to be castout, and the process passes directly from block 610 to block 614, which has been described. If, on the other hand, cache controller 330 determines at block 610 that a reservation for the cache line to be castout is currently held by one of the threads executing in the affiliated processor core 200, cache controller 330 precisely downgrades the coherency state of the cache line in the cache line request, as has been described with respect to block 612.

The first and second embodiments of the present invention thus downgrade the coherency state of a castout cache line when the cache line is castout from an upper level cache memory to a lower level cache memory. No further coherency management of the castout cache line is required to account for the possibility of a reservation for the cache line. (Of course, conventional coherency management of the cache line, for example, in response to snooping operations on the interconnect fabric, is implemented.)

Figure 7:
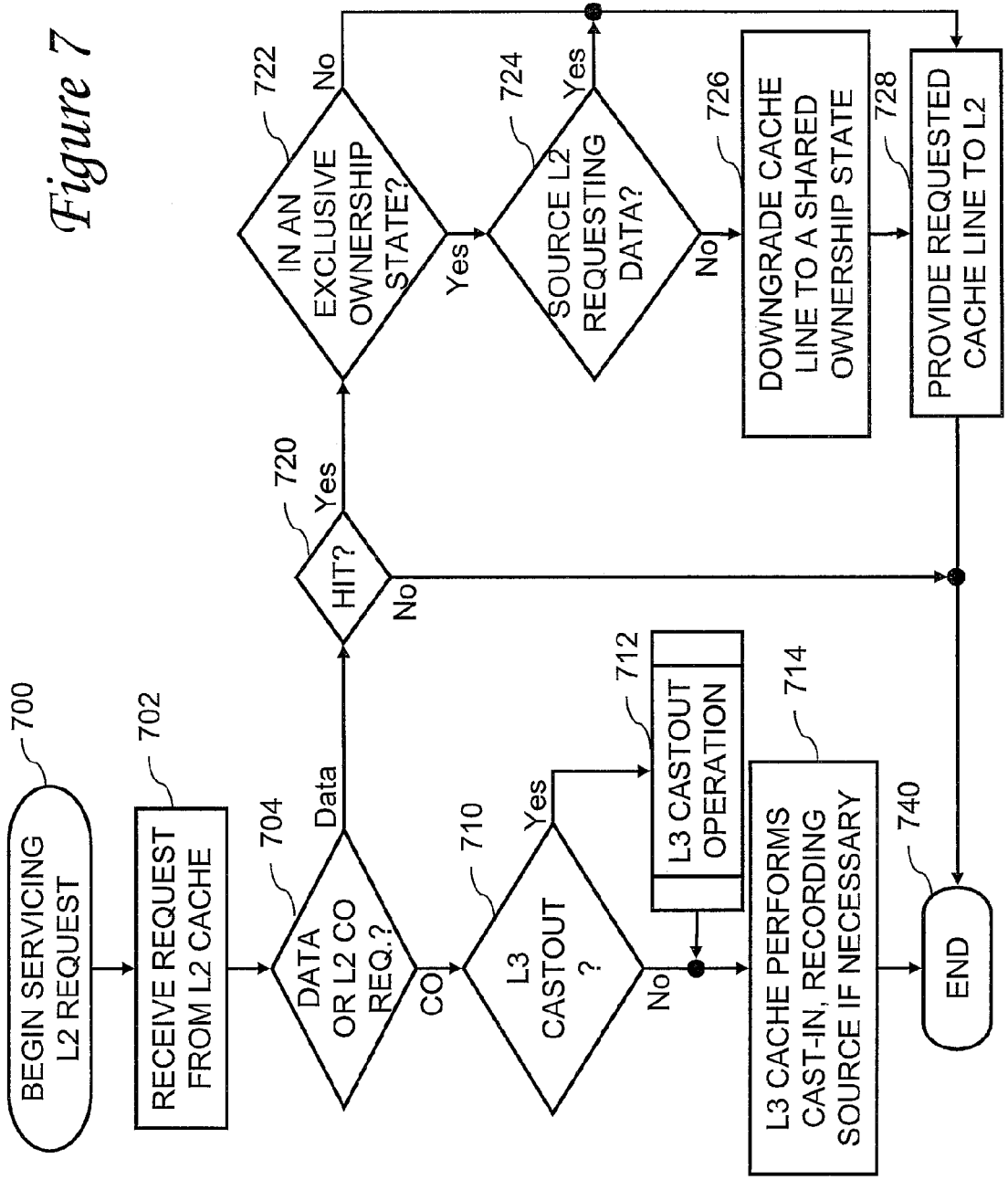
FIG. 7 is a high level logical flowchart of an exemplary method by which an L3 cache memory services an operation received from an L2 cache memory according to third, fourth and fifth embodiments of the present invention.

With reference now to FIG. 7, there is illustrated a high level logical flowchart of an exemplary method of coherency management in accordance with third, fourth and fifth embodiments of the present invention. As described above, in the third, fourth and fifth embodiments of the present invention, the coherency state of a cache line that is held an upper level (e.g., L2) cache in an exclusive ownership (e.g., M or Me) state and then castout to a lower level (e.g., L3) cache is modified, if necessary, to account for a possible reservation of the cache line only upon cache-to-cache transfers of the cache line following the initial castout operation.

The depicted process begins at block 700 and then proceeds to block 702, which illustrates an L3 cache controller 430 receiving a request from a vertically connected L2 cache 230. The request, which may be a L2 castout request or a data request, specifies at least a target address, and if an L2 castout request, a cache line of data to be cached in the L3 data array 410. In response to receipt of the request, cache controller 430 determines the type of the request at block 704. If cache controller 430 determines that the request is an L2 castout request, cache controller 430 services the request as depicted at blocks 710-714, and if cache controller 430 determines that the request is a data request, cache controller 430 services the request as illustrated at blocks 720-728.

If the request is an L2 castout request, cache controller 430 determines at block 710 whether or not to perform an L3 castout to accommodate the castout cache line received from the vertically connected L2 cache 230. According to the present invention, an L3 castout is performed at least when the cache line selected for eviction from the L3 cache is in any exclusive ownership or shared ownership coherency state. If cache controller 430 determines that no castout is to be performed, the process passes directly to block 714, which illustrates L3 cache controller 430 performing a cast-in of the cache line received from L2 cache 230 by updating data array 410 with the cache line data and updating the corresponding entry of cache directory 412. In updating cache directory 412, cache controller 430 updates an entry's tag field 414 with a portion of the cache line address, updates state field 416 with the coherency state specified in the L2 castout request, updates LRU field 418 to reflect the Most Recently Used (MRU) state, and if cache controller 430 implements the fourth or fifth embodiments of the present invention, updates source field 420 to identify the L2 cache 230 that was the source of the L2 castout request. As discussed above, if L3 cache controller 430 implements the third embodiment of the present invention, source field 420 can be omitted from cache directory 412, and no update to a source field is made. Following block 714, the process terminates at block 740.

Returning to block 710, if L3 cache controller 430 determines that an L3 castout should be performed for the L3 cache line evicted to accommodate the cache line received from L2 cache 230, L3 cache controller 430 performs an L3 castout, as depicted at block 712, in addition to the cast-in operations depicted at block 714. If L3 cache 232 is not coupled "horizontally" to another L3 cache 232, L3 cache controller 430 performs a conventional L3 castout to a system memory 108 at block 712. If, however, L3 cache 232 is coupled horizontally to another L3 cache 232 (e.g., as L3 cache 232b is coupled to L3 caches 232a and 232d), L3 cache controller 430 may perform an L3-to-L3 castout at block 712. As noted above, in the third and fourth embodiments of the present invention, which are discussed further below with reference to FIG. 8A, a cache line in an exclusive ownership state is downgraded to a shared ownership state upon an L3-to-L3 castout. No such coherency state downgrade is applied, however, in the fifth embodiment of the present invention, which is discussed below with reference to FIG. 8B.

Referring again to block 704, if cache controller 430 determines that the request received from a vertically connected L2 cache 230 is a data request, L3 cache controller 430 accesses cache directory 412 to determine whether or not the target address of the request results in a cache hit (block 720). If not, the process terminates at block 740. If, however, the specified target address of the request hits in cache directory 412, cache controller 430 determines at block 722 whether or not the target address hit in cache directory 412 in an exclusive ownership (e.g., M or Me) coherency state. If not, cache controller 430 simply provides the requested cache line and an indication of its coherency state to the requesting L2 cache 230, as depicted at block 728. Thereafter, the process terminates at block 740.

In response to a determination at block 722 that the target address of an L2 data request hit in cache directory 412 in an exclusive ownership state, a determination is made at block 724 whether or not the requesting L2 cache 230 was the source of the castout operation that populated L3 cache 232 with the cache line. If cache controller 430 implements the third embodiment of the present invention, the determination depicted at block 724 is affirmative and is made implicitly by the design. If, on the other hand, L3 cache controller 430 implements the fourth or fifth embodiments of the present invention (e.g., is coupled to multiple possible source L2 caches 230, either due to sharing of L3 cache 230 by multiple vertically connected L2 caches 230 (e.g., as L3 cache 232b is shared by vertically connected L2 caches 230b-230c) or due to horizontal coupling of L3 caches 232 to support L3-to L3 castouts), cache controller 430 makes the determination shown at block 724 explicitly by reference to the relevant source field 420 in cache directory 412.

In response to an affirmative determination at block 724, no downgrade to the coherency state of the requested cache line is applied, and the process passes to block 728, which has been described. If, on the other hand, cache controller 430 makes a negative determination at block 724, the process passes to block 726. Block 726 depicts cache controller 430 downgrading the coherency state of the requested cache line from an exclusive ownership state to a shared ownership (e.g., T) state before providing the cache line to the requesting L2 cache 230 at block 728. The coherency state downgrade ensures that any subsequent updates to the cache line are made visible to all caches that need to be aware of the update for reservation management. Thereafter, the process terminates at block 740.

Figure 8B:
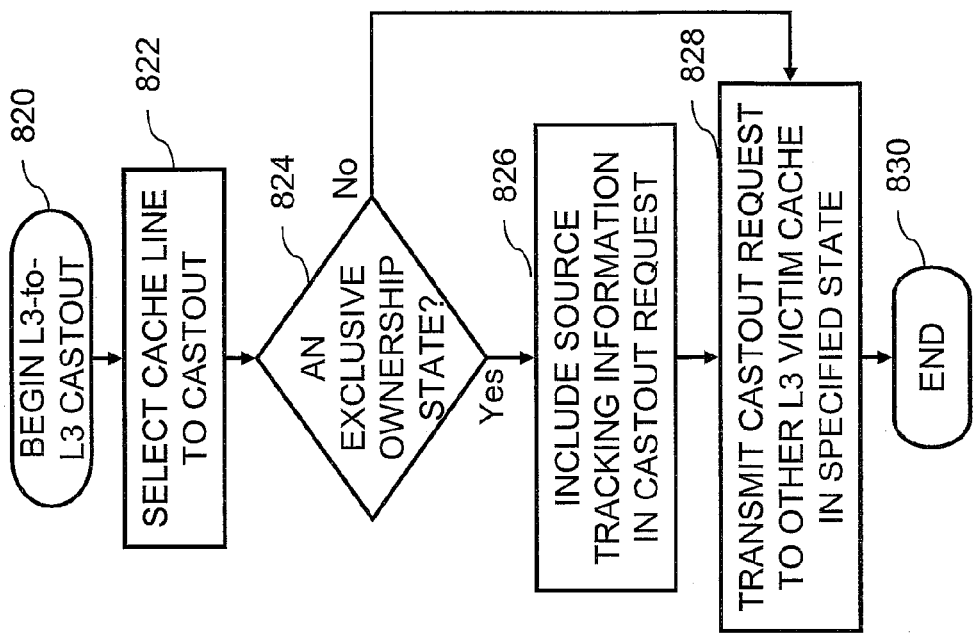
FIG. 8B is a high level logical flowchart of an exemplary method of performing an L3-to-L3 castout operation according to a fifth embodiment of the present invention.
Figure 8A:
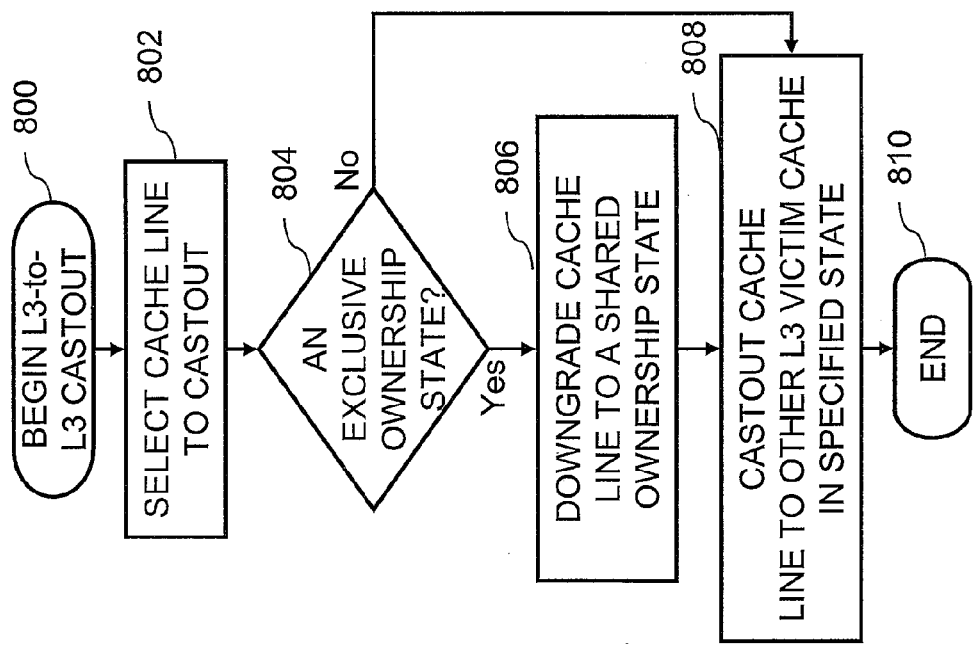
FIG. 8A is a high level logical flowchart of an exemplary method of performing an L3-to-L3 castout operation according to third and fourth embodiments of the present invention.

Referring now to FIG. 8A, there is depicted a high level logical flowchart of an exemplary L3-to-L3 castout process that includes a coherency state downgrade for a cache line in an exclusive ownership state in accordance with the third and fourth embodiments of the present invention. As noted above, the first, second and fifth embodiments of the present invention do not apply such a coherency state downgrade to cache lines in an exclusive ownership state upon an L3-to-L3 castout.

As illustrated, the process begins at block 800, for example, in response to a determination by an L3 cache controller 430 at block 710 of FIG. 7 that an L3 castout operation should be performed to service an L2 castout request. The process then proceeds to block 802, which depicts cache controller 430 selecting a cache line to castout, for example, by reference to the LRU field 418 of directories entries in the congruence class to which the target address of the L2 castout request maps. Cache controller 430 then determines at block 804 whether or not state field 416 indicated an exclusive ownership state (e.g., M or Me) for the cache line immediately prior to initiation of the castout operation. If not, the process passes to block 808, which depicts cache controller 430 transmitting an L3 castout request containing the cache line of data, its real address, and the coherency state recorded within cache directory 412 to another L3 cache 232. The cache controller 430 of the other L3 cache 232 places the cache line in data array 410 and updates the tag field 414, state field 416 and LRU field 418 of the corresponding entry in its cache directory 412 based upon the contents of the castout request. The recipient L3 cache 232 performs any necessary castout to system memory 108. In this case, no coherency state change is made to the cache line by the castout operation. Following block 808, the process terminates at block 810.

Returning to block 804, in response to determining that the cache line to be castout is in an exclusive ownership state, L3 cache controller 430 then downgrades the state of the cache line, as shown at block 806, from an exclusive ownership state (e.g., M or Me) to a shared ownership state (e.g., T). Cache controller 430 then issues an L3 castout request to another L3 cache 232, specifying the shared ownership state (e.g., T), thereby ensuring that any subsequent updates to the cache line are made visible to all caches that need to be aware of the update for reservation management (block 808). Thereafter, the process terminates at block 810.

With reference now to FIG. 8B, there is depicted a high level logical flowchart of an exemplary L3-to-L3 castout process in accordance with the fifth embodiment of the present invention. As noted above, the fifth embodiment of the present invention does not apply a coherency state downgrade to cache lines in an exclusive ownership state upon an L3-to-L3 castout, but does transmit source tracking information in conjunction with the L3-to-L3 castout.

As shown, the process begins at block 820, for example, in response to a determination by an L3 cache controller 430 at block 710 of FIG. 7 that an L3 castout operation should be preformed to service an L2 castout request. The process then proceeds to block 822, which depicts cache controller 430 selecting a cache line to castout, for example, by reference to the LRU field 418 of directories entries in the congruence class to which the target address of the L2 castout request maps. Cache controller 430 then determines at block 824 whether or not state field 416 indicated an exclusive ownership state (e.g., M or Me) for the cache line immediately prior to initiation of the castout operation. If not, the process passes to block 828, which depicts cache controller 430 transmitting an L3 castout request containing the cache line of data, its real address, and the coherency state recorded within cache directory 412 to another L3 cache 232. The cache controller 430 of the other L3 cache 232 places the cache line in data array 410 and updates the tag field 414, state field 416 and LRU field 418 of the corresponding entry in its cache directory 412 based upon the contents of the castout request. No update is made to the source field 420 of the directory entry. In servicing the L3 castout request, the recipient L3 cache 232 performs any necessary castout to system memory 108. Following block 828, the process terminates at block 830.

Returning to block 824, in response to determining that the cache line to be castout is in an exclusive ownership state, L3 cache controller 430 builds an L3 castout request including the cache line of data, its real address, and the coherency state and source tracking information recorded within state field 416 and source field 420 of the relevant directory entry in cache directory 412 (block 826). Cache controller 430 then issues an L3 castout request to another L3 cache 232, as depicted at block 828. In this case, the cache controller 430 of the recipient L3 cache 232 performs any necessary castout to system memory 108 and then performs the cast-in indicated by the L3 castout request. In particular, the cache controller 430 of the recipient L3 cache places the cache line in its data array 410 and updates the tag field 414, state field 416, LRU field 418 and source field 420 of the corresponding entry in its cache directory 412 based upon the contents of the L3 castout request. Thereafter, the process terminates at block 830.

As has been described, the present invention provides an improved data processing system, processor and method of data processing that provide enhanced reservation-aware coherency management. In some embodiments, the coherency state of a cache line in an exclusive ownership state is downgraded, if necessary, upon a castout operation from an upper level cache to a lower level cache in order to account for a reservation that maybe present at an upper level cache. In other embodiments, the coherency state of a castout cache line in an exclusive ownership state is downgraded, if necessary, upon a transfer of the castout cache line vertically to an upper level cache or horizontally to another lower level cache. In either case, the coherency state of the castout cache line is downgraded from the exclusive ownership state to a shared state, such as a shared ownership (e.g., T) state. The use of a shared ownership state enables the recipient cache to source the castout cache line to other caches by cache-to-cache data intervention and guarantees that modified data will not be lost in the event the cache line is evicted from the cache hierarchy.

While the invention has been particularly shown as described with reference to a preferred embodiment, it will be understood by those skilled in the art that various changes in form and detail may be made therein without departing from the spirit and scope of the invention. For example, although the invention has been described with reference to a particular embodiment of a memory hierarchy in which L1, L2 and L3 caches are incorporated within a processing unit, those skilled in the art will appreciate that additional levels of in-line, lookaside or victim caches may be employed and that, in some embodiments of the invention, one or more levels of cache may be off chip. In addition, although the present invention has been described with reference to an exemplary coherency protocol having certain specified coherency states, it should be appreciated that other coherency protocols having differing or additional state names and/or state definitions may be employed.

What is claimed is:

1. A method of coherency management in a multi-processor data processing system having multiple upper level cache memories and a lower level cache memory, said method comprising:
   removing a cache line from a first of the multiple upper level cache memories and transmitting a castout request for the cache line from the first upper level cache memory to a lower level cache memory, said castout request including an indication of an exclusive ownership coherency state;
   in response to the castout request, placing the cache line in the lower level cache memory in said exclusive ownership coherency state and recording a source indication at said lower level cache indicating which of said multiple upper level cache memories was a source of said cache line; and
   in response to a subsequent data request from one of the multiple upper level cache memories, the lower level cache memory determining by reference to said source indication whether the data request was received from the source of the cache line, and if so, supplying the cache line in response to the data request in the exclusive ownership coherency state.

2. The method of claim 1, and further comprising:
   said lower level cache memory supplying the cache line in response to the data request in a shared ownership coherency state if the data request was not received from the source of the cache line.

3. The method of claim 1, wherein:
   said lower level cache memory is a shared victim cache connected to said first upper level cache memory and to a second of the upper level cache memories; and
   said method further comprises receiving said data request from one of said first and said second upper level cache memories.

4. The method of claim 1, wherein said lower level cache memory is a first lower level cache memory, said castout request is a second castout request, and said method further comprises:
   said first lower level cache memory selecting said cache line for replacement;
   in response to selecting said cache line for replacement, transmitting a second castout request from said first lower level cache memory to a second lower level cache memory.

5. The method of claim 4, wherein said second castout request includes an indication of a shared ownership coherency state.

6. A data processing system, comprising:
   first and second processor cores; and a first upper level cache memory coupled to the first processor core and a second upper level cache memory coupled to the second processor core;

a lower level cache memory coupled to the first upper level cache memory and to the second upper level cache memory, said lower level cache memory including:

a data array;

a directory of contents of said data array;

a cache controller that, responsive to receipt of a castout request indicating an exclusive ownership state, places the cache line in the data away in said exclusive ownership coherency state and records a source indication in said directory indicating which of said multiple upper level cache memories was a source of said cache line, wherein said cache controller, responsive to a subsequent data request from one of the multiple upper level cache memories, determines by reference to said source indication whether the data request was received from the source of the cache line, and if so, supplies the cache line in response to the data request in the exclusive ownership coherency state.

7. The data processing system of claim 6, wherein said cache controller supplies the cache line in response to the data request in a shared ownership coherency state if the data request was not received from the source of the cache line.

8. The data processing system of claim 6, wherein said lower level cache memory is a shared victim cache connected to said first upper level cache memory and to said second upper level cache memory.

9. The data processing system of claim 6, wherein:

said lower level cache memory is a first lower level cache memory;

said data processing system includes a second lower level cache memory coupled to the first lower level cache memory;

said castout request is a second castout request;

said cache controller selecting said cache line for replacement, and responsive thereto, transmits a second castout request from said first lower level cache memory to said second lower level cache memory.

10. The data processing system of claim 9, wherein said second castout request includes an indication of a shared ownership coherency state.

* * * * *